(12) United States Patent
Sterne et al.

(10) Patent No.: US 7,342,881 B2
(45) Date of Patent: Mar. 11, 2008

(54) BACKPRESSURE HISTORY MECHANISM IN FLOW CONTROL

(75) Inventors: Jason Sterne, Ottawa (CA); Tom Edward Davis, Ottawa (CA)

(73) Assignee: Alcatel, Paris (FR)

( * ) Notice: Subject to any disclaimer, the term of this patent is extended or adjusted under 35 U.S.C. 154(b) by 1014 days.

(21) Appl. No.: 10/465,233

(22) Filed: Jun. 20, 2003

(65) Prior Publication Data

US 2004/0257991 A1    Dec. 23, 2004

(51) Int. Cl.
*G01R 31/08*  (2006.01)
*G06F 11/00*  (2006.01)
*G08C 15/00*  (2006.01)
*H04J 1/16*  (2006.01)
*H04J 3/14*  (2006.01)
*H04L 1/00*  (2006.01)
*H04L 12/26*  (2006.01)

(52) U.S. Cl. ..................................... 370/232
(58) Field of Classification Search ................ 370/230, 370/231, 235, 413, 236, 232
See application file for complete search history.

(56) References Cited

U.S. PATENT DOCUMENTS

| | | | |
|---|---|---|---|
| 5,453,980 A | 9/1995 | Van Engelshoven | 370/60.1 |
| 5,475,682 A | 12/1995 | Choudhury et al. | 370/60 |
| 5,673,254 A | 9/1997 | Crayford | 370/231 |
| 5,787,071 A | 7/1998 | Basso et al. | 370/231 |
| 5,995,486 A * | 11/1999 | Iliadis | 370/229 |
| 7,046,631 B1 * | 5/2006 | Giroux et al. | 370/234 |
| 2004/0037223 A1 * | 2/2004 | Harrison et al. | 370/235 |

OTHER PUBLICATIONS

Mark Handley et al, in IETF "TCP Friendly Rate Control (TFRC): Protocol Specification", Draft 4, Apr. 27, 2002.*

* cited by examiner

*Primary Examiner*—Seema S. Rao
*Assistant Examiner*—Jianye Wu
(74) *Attorney, Agent, or Firm*—Jim Zegeer (57) ABSTRACT

The backpressure flow control mechanism is widely used in telecommunications network. Actions of the flow control scheme are not instantaneous in that latency always exists between action and reaction, resulting in a flow control round trip time. This flow control round trip time causes ambiguity in determining the amount of traffic in transit. The invention monitors the amount of traffic which is on the way toward the queue during the past period of the round trip time, thus eliminating the ambiguity. A more precise control of traffic flow is possible, realizing reduction of storage space in the queue by one half. In one embodiment, the invention keeps a historical record of flow control signals sent back during the most recent flow control round trip time.

4 Claims, 6 Drawing Sheets

BACKPRESSURE HISTORY MECHANISM IN FLOW CONTROL

FIELD OF THE INVENTION

The present invention relates generally to a flow control technique for data transmission in telecommunications networks. It relates more specifically to a resource efficient way to control flows of data between two stages of queues.

BACKGROUND OF THE INVENTION

Telecommunications networks use buffer memories or queues for a wide variety of purposes. In this specification, buffer memories, buffers, queues and FIFOs are used synonymously, as are cells and packets of data. A telecommunications node such as, a switching element, router, multiplexer e.g., statistical multiplexer, receives data packets at a plurality of input ports and transports them to one or more of its appropriate output ports. Queues are often used at the input and output ports to store the packets temporarily while the node processes the packet headers and executes appropriate actions. The queues are also used to regulate the flow of packets between two nodes or between two stages of modules which make up a node or nodes. The movement of data packets between the stages or nodes is regulated by using available queue space upstream of the congested stage to store data packets intended for it. The queues must, however, be managed properly so that they do not overflow or underflow. For example, when a queue receives packets faster than it can dispose of them, the packets build up in the queue, resulting in a phenomenon called a queue overflow. On the other hand, when it receives packets slower than it is capable of draining, a starved queue or a queue underflow results. In either situation, the performance of the network suffers.

A flow control mechanism between two stages is therefore needed to prevent overflow or underflow of queues. In one example of flow control schemes, a single flow control signal is a binary variable which is transmitted periodically from the second stage (downstream) device to the first stage (upstream) device. The flow control signal takes one of two values: Go; or Stop. A value of Go indicates that the first stage device is permitted to send to the second stage device queue, whereas a value of Stop indicates that the first stage device is not permitted to send to the second stage device queue. The binary flow control such as that described above is typically referred to as backpressure control scheme. The syntax of the flow control signal is typically specified under standard to permit the interoperability of devices.

A single flow control signal exists for each queue in the second stage device. The second stage asserts an independent flow control signal for each queue. The first stage is able to independently schedule traffic destined to each second stage queue so as to avoid head of line blocking. A transmission path of packets is usually made up of many stages and nodes, and the process can be carried back all the way to the first stage in the transmission path.

U.S. Pat. No. 5,673,254 Sep. 30, 1997 Crayford, U.S. Pat. No. 5,787,071 Jul. 28, 1998 Basso et al, U.S. Pat. No. 5,475,682 Dec. 12, 1995 Choudhury et al, U.S. Pat. No. 5,453,980 Sep. 26, 1995 Van Engelshoven describe several variations of backpressure schemes.

Figure 1:
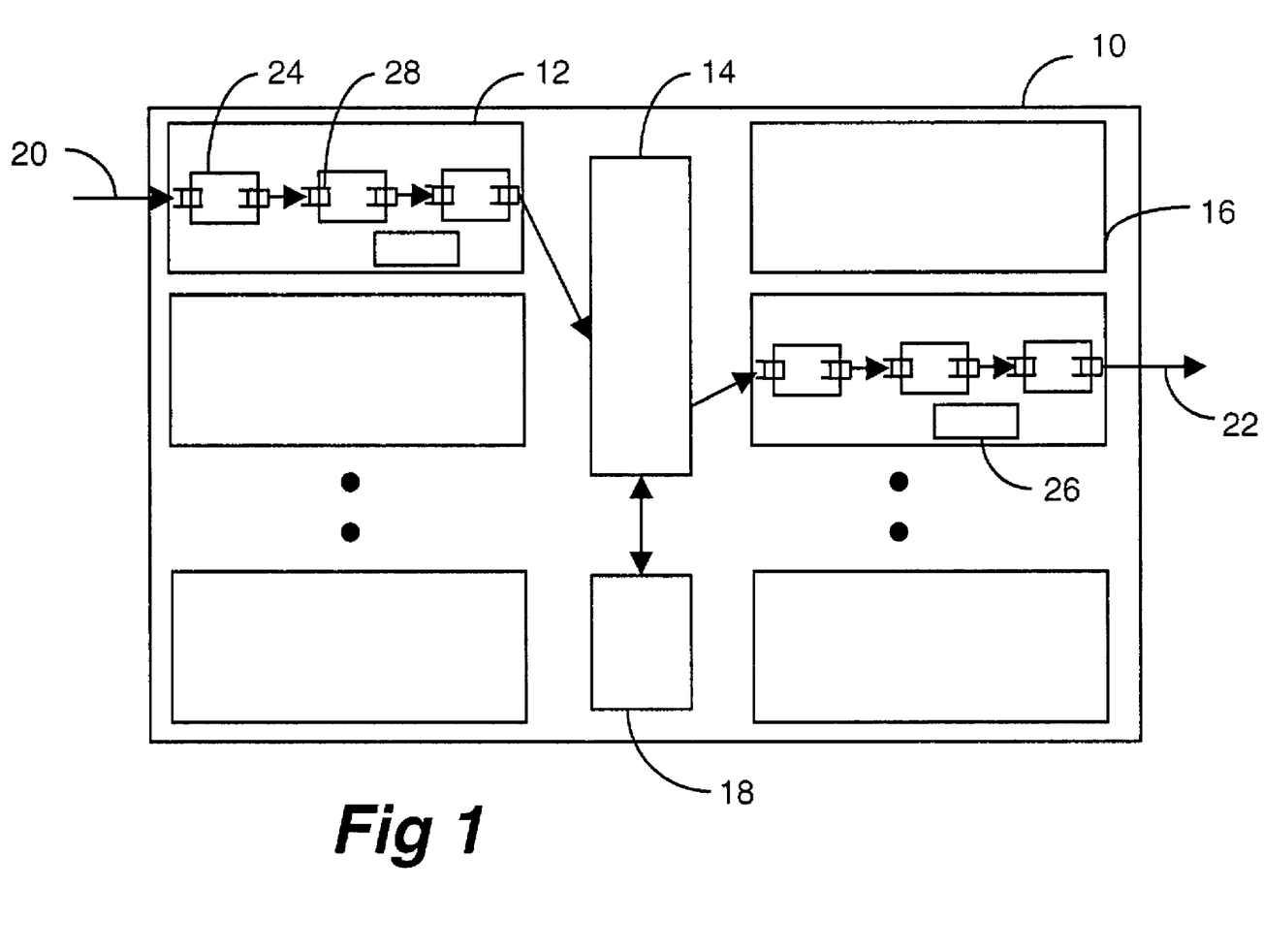
FIG. 1 is a functional block diagram of a switch found widely in a telecommunications network.

FIG. 1 shows a very simple functional block illustration of a switch 10. For example, there are multiple input linecards 12, a switch fabric 14 and multiple output linecards 16. The switch also includes a processor 18 for coordinating the operations of linecards and switch fabric. At 20, data packets come in to an input port of a linecard from e.g., an optical cable, the linecard performs some work and sends the packets through the fabric to another linecard, which in turn transports the packets through its output port at 22 after performing appropriate actions. In a linecard, there may be multiple devices 24 and a separate processor 26 for a variety of functions. Data flows through the multiple devices. When data moves from one device to the next or from one linecard to another through a switch fabric through a connection such as a link or a bus, one device must tell the other to slow down or keep sending. This communication between devices to regulate the data flow is called flow control. There are multiple stages of flow control in that one device tells the upstream device to go ahead and send, and the upstream device sends. The upstream device, in its turn, tells a further upstream device to go ahead and send. Typically between these devices, a flow control signal is needed so that each device knows when it is allowed to send. These devices, therefore, typically have queues 28 or FIFOs to store data packet temporarily. There may be an input queue and/or an output queue on each device. Some devices might not even have a queue but this is an image applied to most of cases.

Another example involves a personal computer or a workstation. A workstation or a server may have multiple CPUs. In any CPU, there might be queues to do certain work, to do web lookups, to do incremental statistics, etc. Again when one CPU is communicating to another, flow control is needed for passing work between the two CPUs.

PRIOR ART SOLUTIONS

Figure 2:
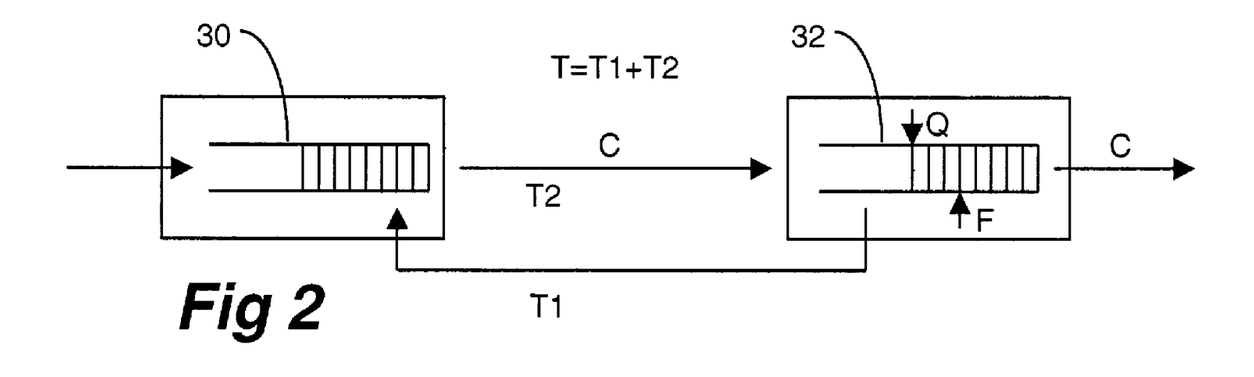
FIG. 2 shows a simplified illustration involving two queues.

FIG. 2 shows a simplified illustration involving two queues, a first stage (upstream) queue 30 and a second stage (downstream) queue 32.

Let C represent the maximum arrival rate (e.g., bits/sec, bytes/sec, cells/sec, etc) into the second stage device. For sake of simplicity, assume that the maximum transmit rate downstream from the second stage device is also C. The second stage queue 32 compares the queue occupancy (e.g., the number of bits, bytes or cells awaiting service from the queue) with a configured threshold F. If the queue occupancy Q exceeds the threshold, then a "Stop" flow control signal is asserted (sent back to the first stage queue 30). If the queue occupancy is less than the threshold, then a "Go" flow control signal is asserted.

The flow control algorithm, therefore, uses the following logic to set the flow control state on the second stage queue.

If (Q>F) then set State=Stop,

Else State=Go.

When a "Stop" signal is sent back to the first stage queue 32, however, the data flow does not stop instantaneously. It would take a certain amount of time before the incoming traffic stops filling the second stage queue 32. This is a concept of round trip time.

Let T1 represent the maximum latency from the point in time that a queue threshold F is crossed in the positive direction to the point in time that the first stage device stops sending traffic to that queue. For sake of simplicity, assume that T1 is the maximum latency from the point in time that a queue threshold is crossed in the negative direction to the point in time that the first stage device starts sending traffic to that queue.

Let T2 represent the maximum latency between the output of the first stage queue to arrival into a queue in the second stage queue. In other words, it would take T2 for the traffic to move from the first stage queue to the second stage queue.

T=T1+T2 is defined as the maximum flow control round trip time.

It can be shown that in order for the second stage queue to not overflow or underflow (i.e. lossless and fully utilized), that the queue size B must be at least 2×C×T.

To demonstrate this, first consider a queue which has been in the Stop state for several T. In the worst case, that queue occupancy is exactly at the threshold F. If the queue begins to drain at C, then it drains to zero occupancy in time F/C. The first stage device must supply new data within that time or the queue underflows. As described above, the round trip time T represents the maximum latency to supply data. Therefore, in order to prevent underflow, $F \geq C \times T$.

Similarly, consider the case, where a queue has been in the Go state for several T, the second stage queue is at threshold F, the first stage queue has sufficient data to fill the capacity C for transmission from one queue to the other, and the second stage queue suddenly blocks from draining. In the worst case, the second stage queue fills at a rate of C for time T. Therefore, the queue size B must have the characteristic that $B \geq F + C \times T$. Therefore, the queue size is constrained by $B \geq 2 \times C \times T$.

The number of queues in the second stage device may be large. For example, if the second stage device is a fabric interface device, it may contain several hundred queues. The value of T for a high speed router is on the order of multiple microseconds. The value of C for a high speed router is on the order of ten Gbps. As a result several Mbits of storage are required in the second stage device. In some cases, a large "T" for a given architecture or a small storage capacity in a stage 2 device may require an intermediate queuing stage between stage 1 and stage 2 or may possibly affect feasibility of a given system design. Furthermore, in order to minimize cost and board area, the second stage device storage is ideally internal to the device. It is therefore desirable to reduce the storage requirement in the second stage device.

The inventive idea stems from the realization that the backpressure flow control mechanism is not instantaneous and the flow control round trip time causes ambiguity in determining the amount of traffic in transit. If the amount of traffic which is on the way toward the queue during the past period of the round trip time is continuously monitored, the ambiguity will be eliminated and a more precise control of traffic flow would be possible to avoid queue overflow. It is also evident that if the size of the queue is at least large enough to hold the amount of traffic which would drain during one round trip time, queue underflow will not occur because a new traffic would arrive before the queue becomes empty.

It is therefore an aspect of the invention that by continuously monitoring the flow control signal, it is possible to determine the amount of traffic which is due to arrive at the queue. This will eliminate ambiguity in the amount of traffic caused by the flow control round trip time.

As mentioned above, the minimum size of the second stage queue depends on its rate of drain and the round trip time. In the case where the rates of arrival and drain are same at the second stage queue, the invention reduces its storage requirement by a factor of 2.

The invention is applicable to an arrangement in which multiple upstream queues transmitting traffic to multiple downstream queues. The transmission of traffic could be through separate links, a bus, and logically partitioned bus.

SUMMARY OF INVENTION

According to one aspect, the invention relates to flow control between two queuing stages, where the first stage contains queues with large buffer storage and the second stage contains queues with limited buffer storage. One of the examples of such equipment is a statistical multiplexer with multiple queuing stages.

As the invention eliminates ambiguity in the amount of traffic due to arrive at the queue during the flow control round trip time, the queue can be made not to overflow by performing backpressure flow control scheme based on the amount of due traffic. This will eliminate the necessity of a large head room in the queue.

The saving in the queue space will be compounded as the telecommunications systems are designed to handle a larger mount of traffic and the number of needed queues increases.

In accordance with another aspect, the invention relates to a method of controlling a traffic flow from a first device to a queue of a second device using a backpressure flow control mechanism. The method includes steps of determining an amount of traffic destined towards the queue of the second device during the most recent flow control round trip time and measuring a current depth of the queue. The method further includes a step of generating a backpressure flow control signal in response to the amount of traffic and the current depth of the queue determined above in relation to the size of the queue.

According to a further aspect, the invention resides in the field of telecommunications networks which utilize backpressure flow control mechanisms in transferring traffic from a first device to a second device, the second device having a queue for storing the traffic from the first device before transferring it further downstream. The invention is directed to a method of saving memory space of the queue and includes a step of providing a history list of backpressure flow control signals generated by the second device to determine an amount of traffic destined towards the queue during the most recent flow control round trip time. The method further includes steps of providing the capacity of the queue at least large enough to sustain queue drainage during a period of flow control round trip time, and generating a new backpressure flow control signal in response to the amount of the traffic so as to avoid overflow of the queue.

In accordance with yet another aspect, the invention relates to an apparatus for transferring a flow of telecommunications traffic from an upstream device to a downstream device. The apparatus includes a queue having a capacity and for storing the flow of traffic from the upstream device before transferring it to the downstream device and a queue depth monitoring module for observing current depth of the queue. The apparatus further includes a memory for holding a history list of backpressure flow control signals which were generated during the most recent flow control round trip time, a calculating module for determining an amount of traffic destined towards the queue from the upstream device during the most recent flow control round trip time, and a flow control signal generator for generating a backpressure flow control signal in response to the current depth of the queue, the amount of traffic thus determined and the capacity of the queue.

DETAILED DESCRIPTION OF EMBODIMENTS OF INVENTION

Figure 3:
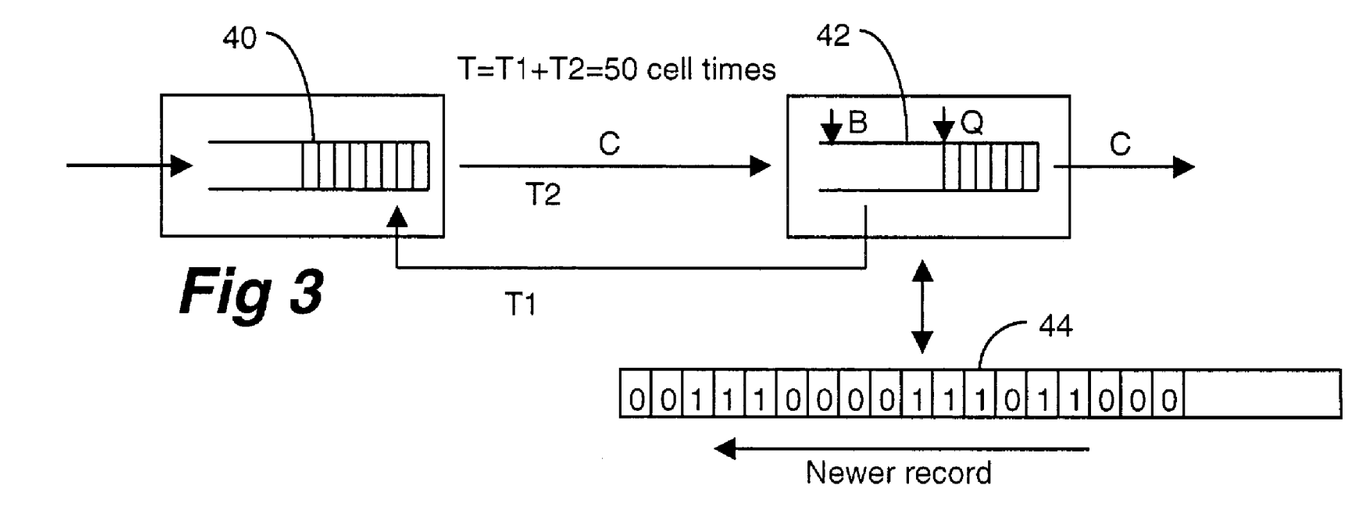
FIG. 3 is a schematic illustration of one embodiment of the invention involving two devices with queues.

FIG. 3 shows the invention according to one embodiment. It shows a similar arrangement of queues as those of FIG. 2. It is assumed to have the same parameters as those discussed in connection with FIG. 2. In FIG. 3, first stage queue 40 and second stage queue 42 are shown in which the second stage queue 42 maintains a history list 44 of the backpressure flow control signals. It should be understood that in practice, there are multiple second stage queues and therefore each second stage queue maintains its history list of control signals which are sent to the first stage device. The history list represents a record of the flow control signals over the most recent round trip time T. The units of the history list are some convenient measure of time (e.g. in an ATM cell flow, a single time unit could be the time required to transmit one cell).

Let Tg represent the total amount of time over the last T that the flow control backpressure signal was in the Go state. Q represents the current queue occupancy of the second stage queue. As defined earlier, B represents the queue size (i.e. maximum occupancy).

The value of the flow control signal produced by the second stage device is set according to the following logic:

If $((Q+Tg \times C) > B)$ then set State=Stop, Else State=Go.

As discussed earlier, the prior art algorithm must assume the worst case volumes of data arrival and data drainage following the "Stop" and "Go" signals to prevent a queue overflow and underflow respectively. In either case, C×T is needed, resulting in the need of at least 2×C×T of storage in the queue.

By using the above algorithm, the invention overcomes this limitation. For example, if the flow control state were not Go for all of the past T, then this condition of the maximum possible data arrival is overly restrictive. In fact, it is only necessary to assert a Stop signal if the queue occupancy Q is within C×Tg. By using this condition instead of that used in the prior art, it is possible to fill the queue to its maximum occupancy. As a result, the invention has the condition that $B \geq C \times T$ in order to avoid overflow as well as underflow (i.e. lossless and full capacity operation).

The invention will be more clearly explained in a quantized manner (in the unit of an ATM cell) by referring to an example shown in FIG. 3. FIG. 3 shows that the queues 40 and 42 are handling an ATM cell stream, sending one ATM cell at every certain period of time e.g., 40 ns. The flow control signal is quantized, that is to say, for example every ATM cell transmission time (e.g., 40 ns), the second stage queue sends a control signal of either go or stop. The history list 44 is made in the units of one ATM cell time. C is therefore measured in ATM cells/sec. The history list contains a record of control signals of e.g., either 0 (Go) or 1 (Stop) which were sent to the first stage queue during the most recent round trip time $T(=T1+T2)$. At every cell time, the oldest entry is taken off the tail of the list and a new entry is put on at the head, indicating whether or not backpressure is asserted. Therefore, Tg is the number of times a "Go" signal was sent during the last T. Supposing that the round trip time T is 50 ATM cell times, it will take 50 cell times until a cell arrives at the second stage queue. So when a "Go" signal is sent, it is like an instruction is given of what should come 50 cell times later. In this example, there are at least 50 slots in the history list, which hold a record of "Go" and "Stop" instructions already given during the previous 50 cell times.

So for example Tg=25 indicates that over the last 50 cell times, the "Go" signal was sent 25 times, indicating that at the most 25 cells can be already on the way to the second stage queue.

By keeping a record of instructions that have been given, it is possible to know how many cells could be on the way to the queue. Without a record, the worst case must be assumed. For example, in this case, 50 cells could be on the way already and the queue space must accommodate these extra 50 cells.

Supposing that the total queue space B is 50 cells, as long as Q+Tg<50, a "Go" signal can be sent to the first stage queue, otherwise a "Stop" signal is sent. This will ensure that the second stage queue will not overflow, that is to say, it will never go over 50 cells. In order to prevent underflow, the queue must have a capacity of 50 cells, assuming that the queue fills and drains cells at the same rate. A new cell should arrive within the time the queue drains all 50 cells, preventing underflow.

The discussion made immediately above deals with traffic quantized in ATM cells. As mentioned earlier, however, the invention can be generalized. In a generalized form, the maximum volume of traffic that can arrive at the second stage queue during one T (in time) is C×T. Tg is defined as the total length of time "Go" signal was sent during the past round trip time T. This will give the amount of traffic which is on the way and is due to arrive at the second stage queue for the next T. The history list should contain the continuous record of Tg. Tg can be recorded in the form of number of bytes or cells or in the form of Tg/T in time.

In an alternative, the flow control signals can be sent on only transition from "Go" to "Stop" or vice versa. The history list should contain the amount of time "Go" in relation to the round trip time.

The size B should therefore be at least C×T to prevent queue underflow. The algorithm described above should prevent queue overflow.

Figure 4:
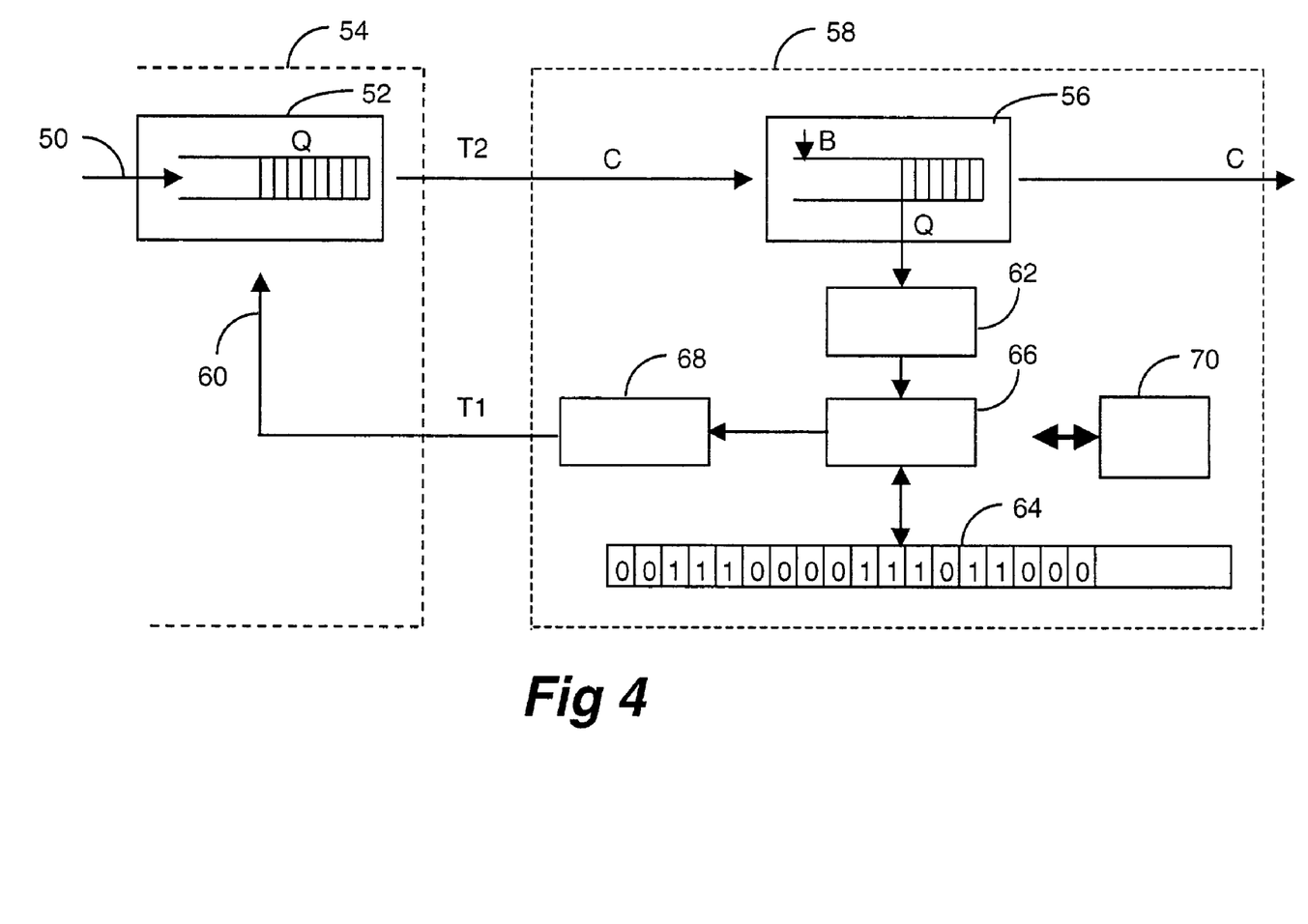
FIG. 4 illustrates schematically a functional block diagram of a flow control mechanism between two queues in accordance with one embodiment of the invention.

FIG. 4 illustrates schematically a functional block diagram of a flow control mechanism between two queues in accordance with one embodiment of the invention. In FIG. 4, upstream traffic 50 buffered in a queue 52 of the first stage 54 is transmitted downstream towards a queue 56 of the second stage 58 in response to the flow control signal received at 60 from the second stage. Transmission rate between the two stages is C as is the rate of drainage of the queue 56 downstream. The depth Q of the queue 56 is constantly monitored by a queue monitoring module 62, meanwhile the history list in a memory 64 is checked to determine Tg and (Q+Tg×C) is calculated at 66 which is compared with the size B of queue 56. The result of the comparison generates a flow control signal at a flow control signal generator 68. The history list is also updated constantly as the flow control signal is generated. A processor 70 coordinates operations of the blocks.

Figure 5:
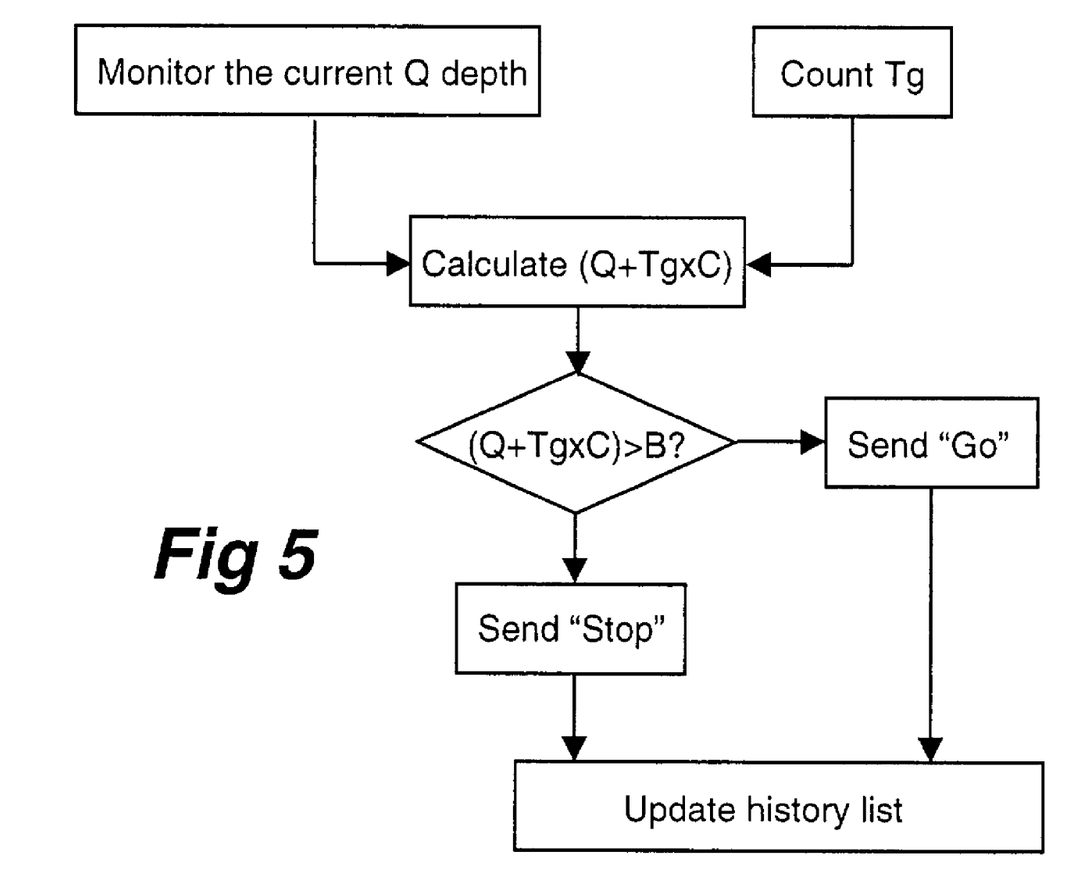
FIG. 5 is a flow chart of the algorithm of the invention in accordance with one embodiment.

FIG. 5 is a flow chart of the algorithm of the invention described above. The algorithm shown in FIG. 5 is performed periodically.

Figure 6:
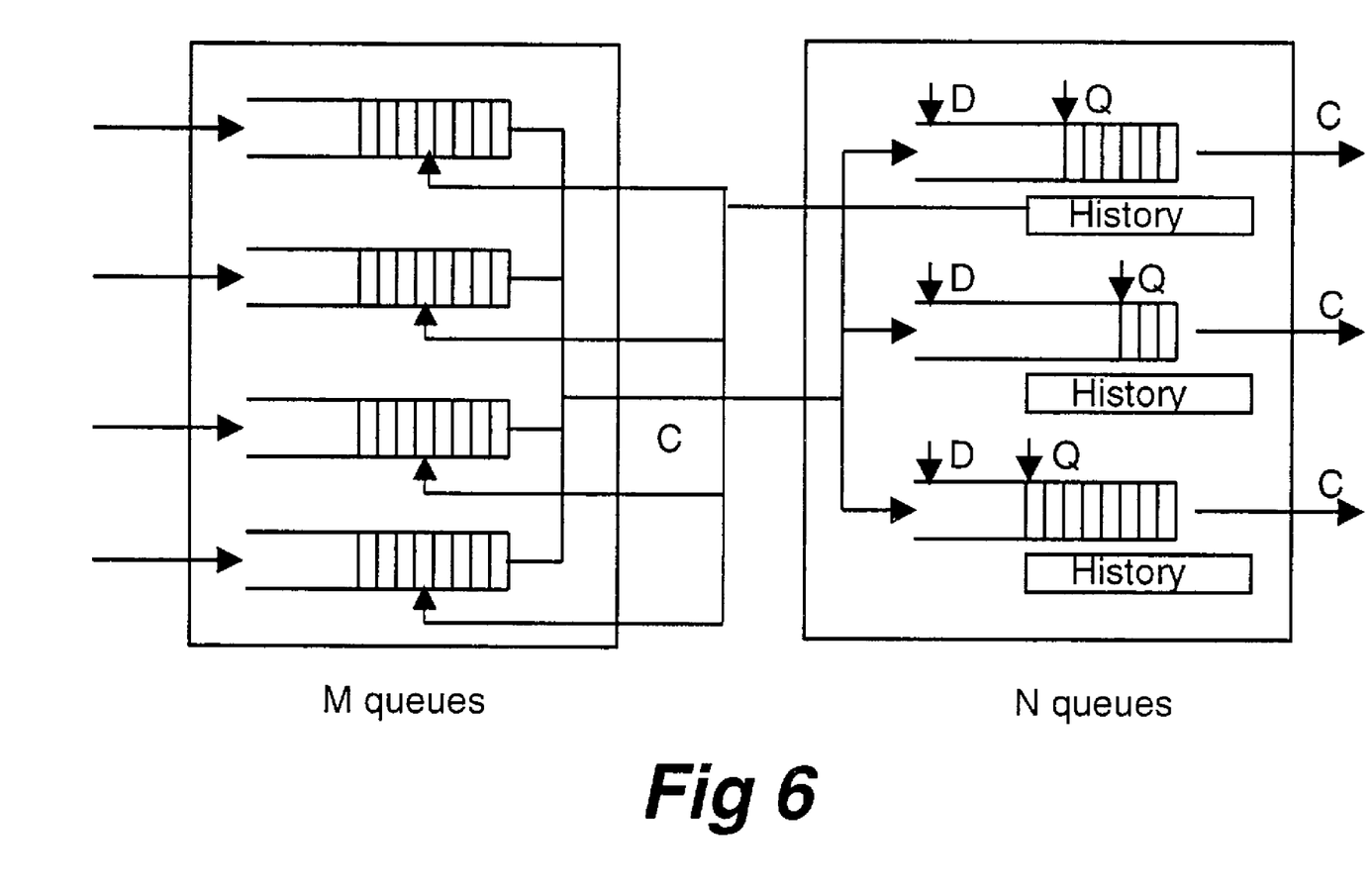
FIG. 6 shows an arrangement in which M queues are sending data to N queues.

The detailed description thus far has dealt with one queue to one queue. The same concept is applicable to cases where multiple queues at the first stage are transferring traffic to multiple queues at the second stage. FIG. 6 shows an arrangement in which M queues are sending data to N queues. Each of N queues at the second stage holds its own history list which contains a record of flow control signals sent out to any of M queues at the first stage. The first stage queues should be able to independently schedule traffic destined to each second stage queue so as to avoid head of line blocking. The link between the first and second stages can be a bus or a logically partitioned bus. The bandwidth of the incoming and outgoing links as well as a bus between the stages is shown to be C but could be any design parameters. The arrangement can be designed so that a given queue in the second stage, if all other queues are blocked or have no data to transmit, can utilize the entire output capacity, C.

It should be noted that in the case where there is a one-to-one correspondence between queues at upstream and downstream stages, the history list of a queue at the downstream stage indicates an exact amount of traffic which is on the way toward the queue during the most recent flow control round trip time. In the cases, however, where there are multiple queues in each stage as shown in FIG. 6, the history list of a queue is still an indication of the amount of traffic destined toward it but it does not necessarily indicate its exact amount. It is because when there are multiple queues, the upstream device may have a selection of several queues in the "Go" state and it may arbitrarily select, by using a certain arbitration scheme, a queue that does not match the queue that is currently sending a "Go" signal. While the indication may not be exact in term of the amount of traffic, it is an exact count of "Go" signals (Tg) for the queue. This ensures that the queue will not overflow.

The arrangement shown in FIG. 6 may find its application for example at the output stage for multiple ports, each port including a queue. In the case of e.g., a TDM port, there is one queue per TDM channel, which may become large in number. Saving in memory space in this circumstance will be substantial.

Figure 7:
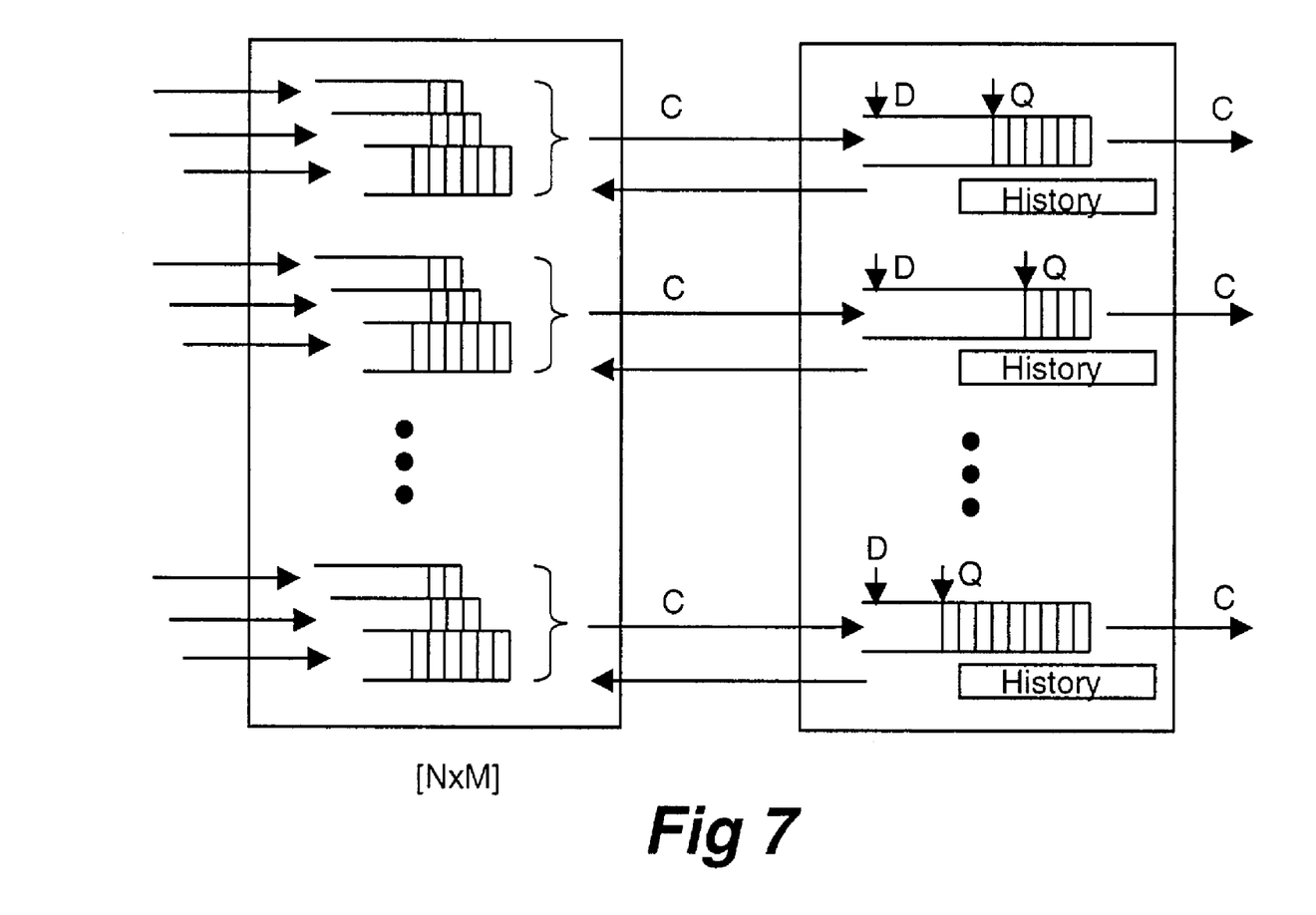
FIG. 7 shows an arrangement of [N×M]:1 switch fabric interface.

FIG. 7 shows another arrangement of queues ([N×M]:1) at a switch fabric interface. Each queue at the second stage includes a history list for a corresponding block of queues at the first stage.

This solution can also be applied to solve another related problem. When designing a system that contains two queuing stages (as described above), it might be necessary to interface a backpressure based first stage to a credit based second stage (e.g. when trying to use $3^{rd}$ party components that are already designed).

An obvious solution would be to create an intermediate queuing stage (stage M) that receives flow control information in the form of credits (i.e. current queue occupancy) from stage 2, queues data, and then feeds flow control information based on the stage M queues back to stage 1 using backpressure signals. This intermediate queuing stage may be necessary if the stage 1 device has a reaction time to backpressure information that is too slow and could cause the queues in stage 2 to underflow or overflow.

Applying this invention to this problem can lead to a solution that doesn't require an intermediate queuing device between stages 1 and 2. Instead of a queuing stage we could use a (simpler, smaller, less expensive) device that performs a mediation function between the credit based flow control of stage 2 and the backpressure flow control of stage 1. This mediation function would receive credit based flow control from stage 2 and translate into backpressure based flow control towards stage 1. The generation of backpressure towards stage 1 could benefit from the backpressure history by reducing the effect of "T" between stage 1 and the mediation device on the requirement for a depth "B" in stage 2. Without the backpressure history, the size B of the queues in stage 2 has to account for 2× the "T" value between stage 1 and the mediation device. With the backpressure history, the size of the queues in stage 2 only have to account for 1× the "T" value between stage 1 and the mediation device. This can allow smaller queues and storage in stage 2 and/or allow stage 1 and stage 2 to be connected without an intermediate queuing stage.

The invention is more complex than the prior art in that history lists must be maintained for each queue. Also, the backpressure state in the scheme described by the invention may change for multiple queues simultaneously, whereas it changes for a maximum of 2 queues in the prior art scheme. The invention, however, results in lower power and potentially lower board area (if external memory were required in the stage 2 device using a prior art solution) than a solution which uses the prior art. As a result, the use of the invention may be necessary for operation feasibility of certain system designs.

What we claim as our invention is:

1. A method of controlling a traffic flow from a first device to a queue of a second device using a backpressure flow control mechanism, comprising steps of:

determining an amount of traffic destined towards the queue of the second device during the most recent flow control round trip time by retaining a record of east backpressure flow control signals generated during a most recent flow control round trip time, wherein the backpressure flow control signal takes a value of either "Stop" or "Go" and then calculating from the record the amount of time the backpressure flow control signals have indicated that the transfer of the traffic can proceed, by measuring the amount of time Tg a "Go" value was asserted;

measuring a current depth Q of the queue; and generating a backpressure flow control signal in response to the amount of traffic and the current depth of the queue determined above in relation to the size of the queue, according to the following logic:

If ((O+Tg×C)>B) then set State=Stop,

Else State=Go where C is the rate of traffic transfer from the first device to the second device.

2. The method according to claim 1, wherein the traffic flow is always a queue of the first device to a queue of the second device and the step of determining an amount of traffic determines an exact amount of traffic destined towards the queue of the second device during the most recent flow control round trip time.

3. An apparatus for transferring a flow of telecommunications traffic from an upstream device to a downstream device, wherein the traffic is in packets and a backpressure flow control signal of either "Go" or "Stop" is generated upon reception of a unit of packets from the upstream device, comprising:

a queue having a capacity and for storing the flow of traffic from the upstream device before transferring it to the downstream device, wherein the capacity of the queue is at least large enough to hold the sufficient amount of traffic for drainage during a period of the flow control round trip time;

a queue depth monitoring module for observing current depth of the queue;

a memory for holding a history list of backpressure flow control signals which were generated during the most recent flow control round trip time;

a calculating module for determining an amount of traffic destined towards the queue from the upstream device during the most recent flow control round trip time; the calculating module calculating the length of time when backpressure flow control signals of "Go" has been asserted during the most recent flow control round trip time, and wherein the calculating module for counting the number of "Go" backpressure flow control signals in the history list;

a flow control signal generator for generating a backpressure flow control signal in response to the current depth of the queue, the amount of traffic thus determined and the capacity of the queue; and wherein the flow control signal generator generates a backpressure flow control signal in response to the following logic:

If $((O+Tg \times C) > B)$ then set State=Stop,

Else State=Go in which O is the current depth of the queue, Tg is the length of time when backpressure flow control signals of "Go" has been asserted during the most recent flow control round trip time, C is the rate of traffic transfer from the first device to the second device and B is the capacity of the queue.

4. A method of controlling a traffic flow from a first device to a queue of a second device using a backpressure flow control mechanism, comprising steps of:

determining an amount of traffic destined towards the queue of the second device during the most recent flow control round trip time;

measuring a current depth of the queue;

generating a backpressure flow control signal in response to the amount of traffic and the current depth of the queue determined above in relation to the size of the queue; and wherein there are multiple queues in the first and second devices, and the traffic is able to flow from any queue in the first device to any queue in the second device in accordance with a programmed schedule, the method further comprising steps, at each queue in the second device, of:

determining an amount of traffic destined towards the queue during the most recent flow control round trip time by retaining a record of past backpressure flow control signals generated by the queue during the most recent flow control round trip time, wherein the backpressure flow control signal takes a value of either "Stop" or "Go" and the step of calculating measures the amount of time "Go" was asserted; calculating from the record the amount of time the backpressure flow control signals have indicated that the transfer of the traffic can proceed towards the queue;

measuring a current depth of the queue; and generating a backpressure flow control signal in response to the amount of traffic and the current depth of the queue determined above in relation to the size of the queue; and wherein backpressure flow control signal is generated according to the following logic:

If $((Q+Tg \times C) > B)$ then set State=Stop,

Else State=Go in which Q is the current depth of the queue, Tg is the amount of time of the "Go" backpressure flow control signals in the history list and C is the rate of traffic transfer from the first device to the second device.

* * * * *